United States Patent
Kane et al.

(10) Patent No.: US 6,389,429 B1
(45) Date of Patent: May 14, 2002

(54) SYSTEM AND METHOD FOR GENERATING A TARGET DATABASE FROM ONE OR MORE SOURCE DATABASES

(75) Inventors: Donald E. Kane, Fishers; Douglas R. G. White, Westfield; Tim Sublette, Indianapolis, all of IN (US)

(73) Assignee: Aprimo, Inc., Indianapolis, IN (US)

( * ) Notice: Subject to any disclaimer, the term of this patent is extended or adjusted under 35 U.S.C. 154(b) by 0 days.

(21) Appl. No.: 09/364,347

(22) Filed: Jul. 30, 1999

(51) Int. Cl.[7] .......................... G06F 12/00; G06F 17/60
(52) U.S. Cl. ............................. 707/200; 705/7
(58) Field of Search .................. 707/1–10, 100–104, 707/200, 206, 500, 525; 705/7–10, 35–38

(56) References Cited

U.S. PATENT DOCUMENTS 6,029,178 A * 2/2000 Martin et al. ................ 707/201
6,216,175 B1 * 4/2001 Sliger et al. .................... 710/1

OTHER PUBLICATIONS

Knuth, Donald E., The Art of Computer Programming (TAOCP), vol. 1–5, 1997, 1998, 1999.
ITECS, North Carolina State University, GNU ISPELL, EOS and Unity Software, and Index, 1997.
Lait and Randell, An Assessment of Name Matching Algorithms, 1995.

* cited by examiner

Primary Examiner—Hosain T. Alam
Assistant Examiner—Alford W. Kindred
(74) Attorney, Agent, or Firm—Ice Miller; Doreen J. Gridley

(57) ABSTRACT

A software system and method is disclosed for creating and maintaining an audience member database based on multiple source audience member databases. Rankings of relative accuracy of data elements of each source database are maintained. To determine whether a given source database record represents the same audience member represented by a record of the target database, comparisons are made of various non-encoded and encoded fields of the respective databases to identify the most closely-matching target database record. If such a record is identified, only those fields from the source records that have a higher accuracy ranking than the fields in the target database are updated. The target database itself may be directly editable and its fields may be associated with accuracy rankings. Optionally, the user may select parameters to specify how closely candidate match records must match in order to achieve the optimal balance of speed vs. accuracy.

13 Claims, 3 Drawing Sheets

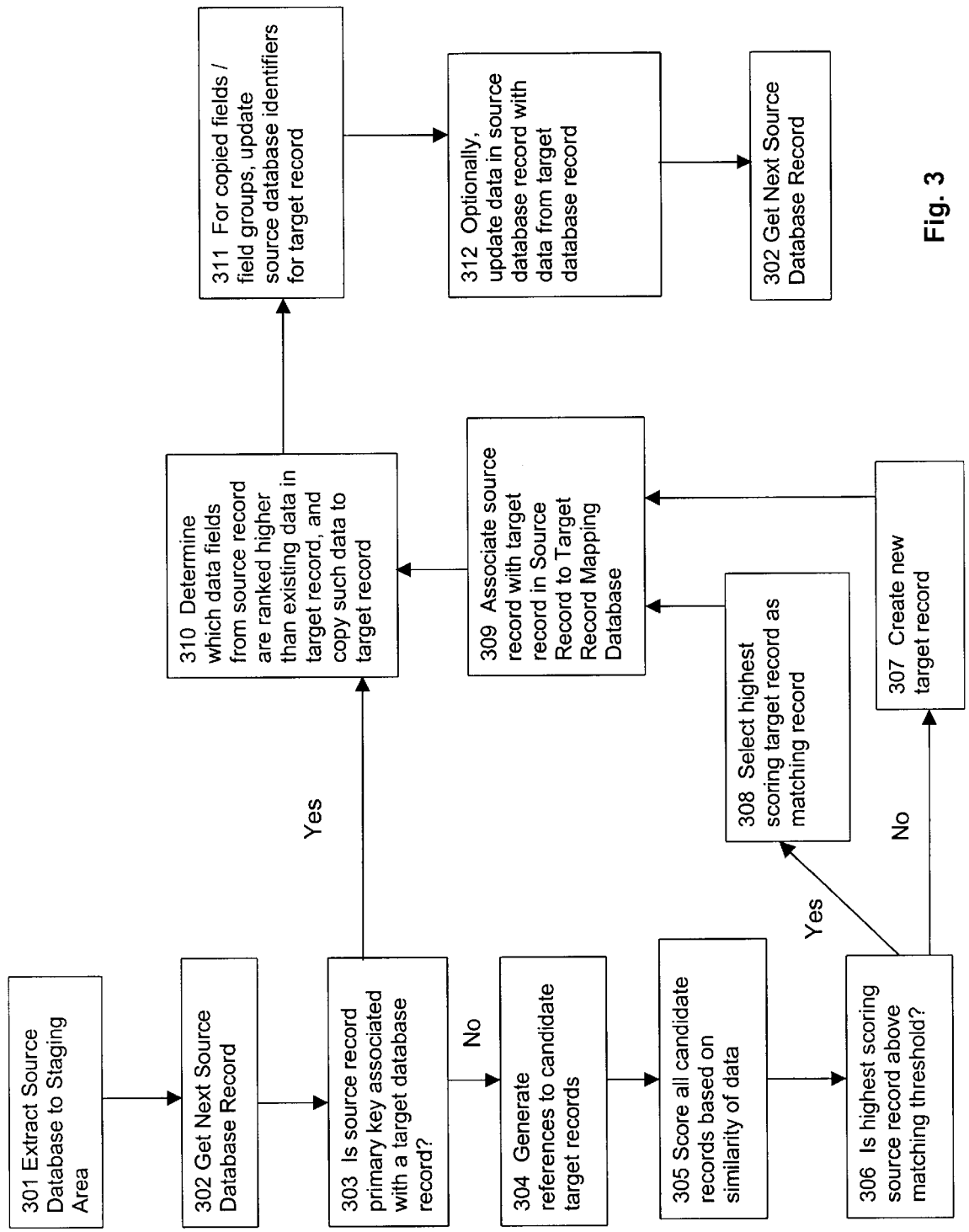

SYSTEM AND METHOD FOR GENERATING A TARGET DATABASE FROM ONE OR MORE SOURCE DATABASES

FIELD OF THE INVENTION

The present invention relates to systems for creating and maintaining a database of audience members, and in particular to systems for creating and maintaining such a database from source databases containing contact information about audience members.

BACKGROUND

A growing trend in business is to improve the quality of communication provided to individuals with whom a business interacts, including, but not limited to, customers, potential customers, employees, shareholders, service providers and other stakeholders. One way of improving such communications is to ensure the information a business has about each individual is complete and up to date. Many businesses maintain multiple databases containing information about individuals with whom they communicate. For example, information about a business' employees might be found in a human resources database, a department database, a retirement plan database and an insurance database. Alternatively, information about a business' customers might be found, for example, in an externally purchased mailing list database, a trade show lead database, a salesperson's contact manager database, and a customer service department database. In each case, information in these databases is often replicated and out-of-date. Moreover, different databases are often updated by different departments of an organization, and a change by one department's database about a particular individual or business may not necessarily cause the same information about the individual or business in a different department's database to be updated. Moreover, when records from different databases, but which contain information about the same individual, are inconsistent, it is difficult to determine which database is more likely to contain accurate data. This results in inaccurate or incomplete communications from the business to the recipient of the communication. Such inaccurate information diminishes the quality of communications with individuals, for example, for one-to-one marketing campaigns.

Data warehousing is a recently popular technique for assimilating information from disparate databases. However, databases created as a result of data warehousing generally have data no more accurate than the most accurate database from which the newly created database is derived. Accordingly, it is desirable to provide a system that can assimilate data from multiple data sources while maintaining data accuracy.

Moreover, for large businesses with millions of customers, exhaustively searching their database for prospective matches can quickly grow to an unmanageable task. Comparisons of fields in database records take time, and repeating such comparisons millions of times for each record to match is not practical.

SUMMARY OF THE INVENTION

In one embodiment, the invention comprises a software system and method comprising a plurality of source databases, each source database comprising, a plurality of source audience member records, and a plurality of source fields for each source audience member record; a target database comprising: a plurality of target audience member records, at least some of which identify the same audience member identified by at least one source database audience member record, and a plurality of target fields for each target audience member record. The system also includes means for mapping at least one target database field to corresponding source fields of each of a plurality of source databases, and, for each such mapping, means for ranking a relative priority between (a) the source fields of the each of the plurality of source databases and the target field, and (b) the target database field. Software provides for selecting from at least one of the plurality of source databases, a source audience member record that matches a target audience member record, and means for updating the fields in the target matching record of the target database from multiple mapped fields in the plurality of source databases, including selecting, from among the source database fields to which the target database fields are mapped, the highest ranked priority fields.

A method provides for generating, for a source audience member record having at least first and second fields, a set of matching candidate audience member records having multiple fields from a target audience member database, wherein there is no pre-defined relationship between the source audience member record and any record of the target audience member database, comprising the steps of:

a. providing first and second indices to the target audience member database based on at least first and second fields of the target database;
b. specifying a match-closeness parameter;
c. generating multiple references to records of the target audience member database by querying the first index for similarities based on the first field of the source audience member record, the quantity of multiple references being responsive to the match-closeness parameter; and
d. generating additional multiple references to records of the target audience member database by querying the second index for similarities based on the second field of the source audience member record, the quantity of additional multiple references being responsive the to the match-closeness parameter.

Additionally, software provides a method for updating a target record having at least three fields of an audience member database that identifies the same audience member of a source audience member record having at least three fields, wherein there is no pre-defined relationship between the source audience member record and any record of the target audience member database, comprising the steps of:

a. providing at least two non-encoded field indices to the target audience member database based on at least first and second fields of the database;
b. providing at least one encoded field index to the target audience member database based on a third field of the database;
c. querying each of the at least two non-encoded indices for matches to a field of the source audience member record, and storing references to target audience member database records having matching value fields in the set of matching candidate audience member records;
d. encoding a value of a field of the source audience member record that corresponds to an encoded index of the target audience member database;
e. querying the at least one encoded field index for matches to the encoded field value of the source audience member record, and storing references to target audience member database records having matching encoded value fields in the set of matching candidate audience member records;

f. selecting one of the references to a target audience member database records; and g. replacing at least one field in the record of the target audience member database that matches the selected reference, with the at least one corresponding field of the source audience member record.

The software further provides a method for selecting one of a set target audience member records and updating at least one field of the selected record with information from at least one field of a source audience member record, comprising the steps of:

a. mapping a plurality of fields from the source audience member record to corresponding fields in the set of target audience member records;

b. for at least some of the plurality of corresponding mapped fields, generating encoded representations of such fields from the source audience member record;

c. for each record of the set of target audience member records:
  1. and for each mapped field of each target audience member records:
    A. comparing the field or its encoded representation to the corresponding field or its encoded representation of the source audience member record;
    B. assigning a match score value to the target audience member record for the field based on the extent of the match;
  2. aggregating the plurality of match scores for the target audience member record;

d. selecting the target audience member record having the highest aggregated match score value; and e. updating a plurality of fields in the selected target audience member record with information from corresponding fields from the source audience member record.

BRIEF DESCRIPTION OF THE DRAWINGS

FIG. 3 shows a flowchart showing representative steps for processing a record of a source database pursuant to the present invention.

DETAILED DESCRIPTION

Figure 1:
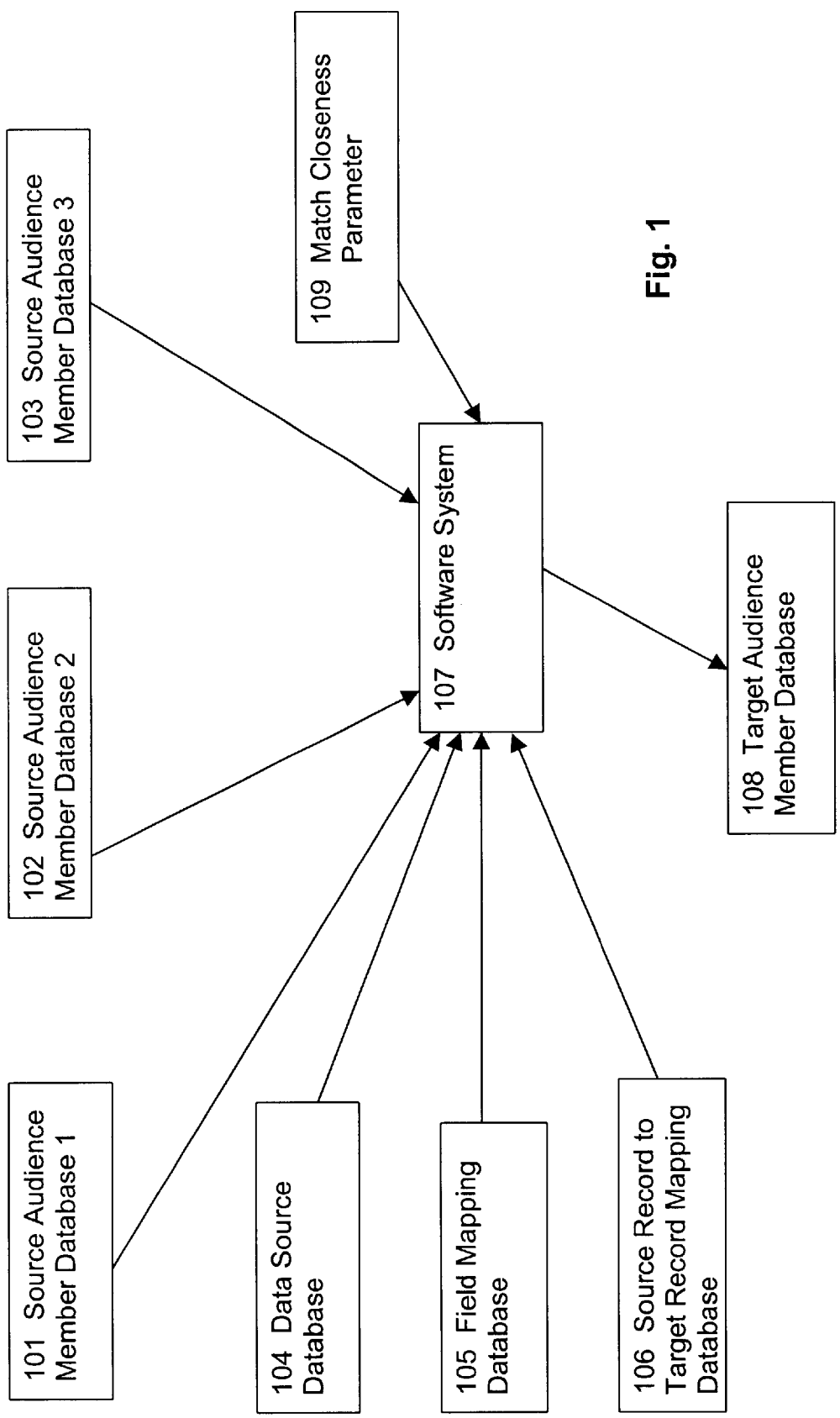
FIG. 1 shows a representative overview of the system, including source, target and utility databases, in addition to the software system.

The invention includes a target database 108 containing a plurality of records with information regarding audience members. An audience member will often be a person, but may also be some other identifier of a business or entity, such as a business name or an email address. However, any audience member must be able to be a recipient of a communication. The target database 108 of audience member records may have any desired record layout, but the following representative layout is suitable.

| Target Database Field Name | Representative Value |
| --- | --- |
| Firstname | Adam |
| Lastname | Abel |
| StreetNumber | 123 |
| StreetName | Main St. |

-continued

| Target Database Field Name | Representative Value |
| --- | --- |
| City | Chicago |
| State | IL |
| ZipCode | 60606 |
| AreaCode | 312 |
| PhoneNumber | 3219900 |
| Email | Abel@hotmail.com |
| name_datasource_id, | Source Database 1 |
| address_datasource_id | Source Database 3 |
| phone_datasource_id | Source Database 9 |
| email_datasource_id | Target Database |
| Primary_key | 45632211 |

It will be appreciated that the target audience member database 108 may contain millions of records. It is not necessary that each field of the database be indexed, but in general, indexing more fields permits more accurate matching of audience member records as described below.

In accordance with the present invention, there may be multiple other source databases 101, 102, 103 containing a plurality of audience member records to which an organization has access. Representatively, these may include databases from different departments within the organization, such a sales, marketing, human resources, division, etc., and from different types of software systems, such as Enterprise Resource Planning (ERP), Customer Support Solutions (CSS), and Sales Force Automation (SFA). Furthermore, businesses often purchase customer prospect lists from various sources. It is likely that different databases contain information about the same audience member, but that data within the databases may be inconsistent. Moreover, many of the source databases may not have all of the same fields of field names of the target/target database. For example, two databases could have the following layouts:

| Source Database 1 Field Name | Representative Value | Source Database 2 Field Name | Representative Value |
| --- | --- | --- | --- |
| First-id | Adam | Name | Adam B. Abel |
| Last-id | Abel | StreetNumber | 123 |
| Street-id | 123 Main St | StreetName | Main |
| City-id | Chicago | CityName | Chicago |
| State-id | IL | StateName | Illinois |
| Zip-id | 60606 | ZipCode | 60606 |
| Phone-id | (312) 321-9900 | County | Cook |
| Email-address-id | Abel@hotmail.com | ACPhone-Day | 3123219932 |
| | | Login | Abel@iquest.net |

Of course, representative source databases 101, 102, 103 may also have other fields, such as a primary key or a time/date stamp indicating the last time the record was changed.

In order to capitalize on a business' investment in data, the most accurate data from each database should be consolidated. Source databases can be used to update the target database either once, as with a purchased prospect list, or periodically, such as with a customer database that is continuously changed. In addition, when an audience member is found in multiple sources, it is desirable to prioritize at a field level for each source the data that should be used when building the audience member record. Moreover, a system must be able to relate target records within the target database with new records from the various source databases. Finally, a system should allow the ability to choose between speed and consistency in the match and merge function.

In accordance with the present invention, a target database 108 is provided having records regarding audience members. One or more source databases 101, 102, 103 may also be provided having records regarding audience members. Information about audience members form the source databases 101, 102, 103 may be used to update target audience member records in the target database 108, or to add new records to the target database in the following manner.

I. Prepare Target Database

A. Target Database Structure and Preparation (201)

The target database 108 has a record layout containing information about audience members. In one embodiment, the record layout also includes references to source databases for different classes of audience member information. For example, the fields of the target database could include: primary key, first_name, middle_name, last_name, address1, address2, city, state, zip_code, phone, email, last_name_code, email_id_code, name_datasource_id, address_datasource_id, phone_datasource_id, and email_datasource_id. In this example, last_name_code contains a phonetically encoded representation of the last name, email_id_code contains a phonetically encoded representation of the email address, name_datasource_id contains a reference to the source database for the field grouping first_name, middle_name and last_name fields, address_datasource_id contains a reference to the source database field grouping for the address1, address2, city, state and zip_code fields, phone_datasource_id contains a reference to the source database for the phone field, and email_datasource_id contains a reference to the source database for the email field. Those of skill in the art will appreciate that a system could be provided with a separate source database fields for each and every data field, instead of grouping together multiple fields for name, address, phone and email.

B. Index Fields to be Used for Matching Records

Figure 2:
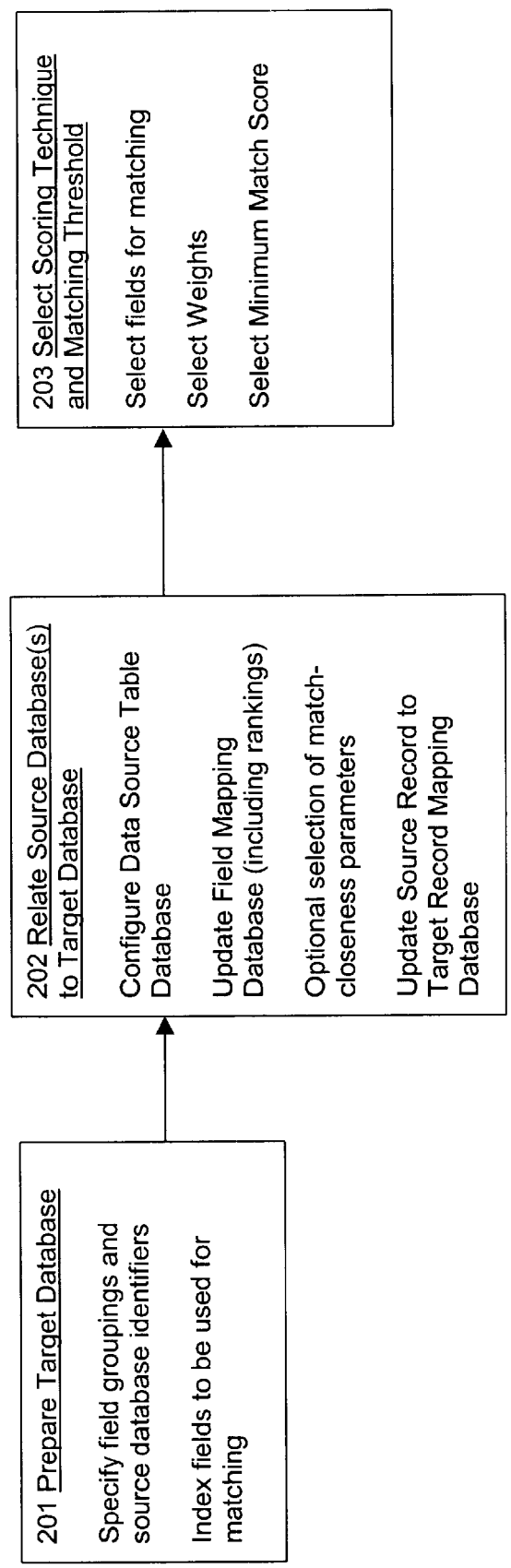
FIG. 2 shows a flowchart showing representative steps for preparing databases for processing pursuant to the present invention.

If not previously created, an index should be created for those fields in the target database that will be used in the process for matching records from a source database as shown in step 201 of FIG. 2. Most database systems automatically create these indices when database content changes. It is preferable to create such indices for fields that may be used to match audience members. Usually, these will be text fields, although a text field may also include numerals or punctuation (as opposed to graphics fields). Indices may be based on the full content of a field, part of the content of the field, or an encoded representation of the content of a field. For example, a field such as email address may be fully matched (an "exact-match" index), meaning that a match between an email address field in a source record and an email address field in the target database will be deemed to exist only if both fields exactly match. A field such as zip code may be partially matched (e.g., a sub-field), for example, by using only the first three of the five numerals comprising a zip code. This means that a match between a zip code field in a source record and a zip code field in the target database will be deemed to exist if all three of the indexed numerals match, even if subsequent numerals do not match. Using partially matched fields can be beneficial for some fields, because, as described further below, it may avoid using, in the matching process, data elements that tend to contain errors. In addition, using partially matched fields can reduce processing time as compared to fully matched fields. Fields suitable for partial match indexing include phone number, zip code, and the street number from an address. Finally, encoded field indexing may be used. This form of indexing is most useful for fields likely to contain spelling errors. In one embodiment, fields are phonetically encoded using an algorithm that captures a representation of a word or word, such as the Soundex Algorithm (Knuth). This algorithm normalizes away spelling and typographical errors. Logical field types for using encoded indices are last names, email IDs, company names, and street names.

C. Relate Target and Source Databases

As shown as step 202 in FIG. 2, in one embodiment, it is desirable to create several utility or linking databases which can be used to store information about the source and target databases, and how information in the source databases 101, 102 and 103 is related to information in the target database 108. The first linking database is a data source database 104, which contains a list of source databases and information on how they may be accessed by the system. Representative fields and field descriptions for the data source database are:

Data Source Table Database data source id—unique source database identifier server name—where the source database resides name—for display only connect string—for accessing source database data source key—name of primary key field SQL string—for extracting data from source database description—for display only last update date-time—last time this source database was used to update the target database A second linking/utility database contains field maps. Field mapping database 105 is used to hold all of the mappings between each source database field containing information which may be copied to the target database, and the corresponding target database field. Representative fields and field descriptions for the field mapping database are:

Field Mapping Database field map id—unique identifier data source id—source database identifier name—display only data source field—name of field in source database data destination field—name of field in target database priority—relative priority of this field of source database bidirectional flag—indicates whether the source database may be updated by receiving copies of data from the corresponding field of the target database description—display only A third linking/utility database contains primary keys of the target database records and primary keys of corresponding records of source databases, and is designated as source record to target record mapping database 106 in FIG. 1. The first time an audience member record from a source database is matched to an audience member record in the target database 108, the primary keys of each record are stored in this database. The second time the same source database is used to update the target database 108, it is unnecessary to try to identify a match based on the audience member data from each database; instead, the primary keys from each database may be used to instantly match the corresponding records. It will be appreciated that if data from target database record has come from multiple source databases, that the primary key of the target database will appear multiple times; once for each source database record. Representative fields and field descriptions for the source record to target record mapping database are:

Source Record to Target Record Mapping Database id—unique identifier data source id—source database identifier data source primary key—primary key in data source table target database audience member primary key—primary key of record in target database that corresponds to the data source primary key Those of skill in the art will appreciate that there are many other ways that relationships between source database records and target database records could be specified, and the above database structures and relationships are merely representative.

II. Prepare Source Database and Define Extract Table

For those fields in a source database 101, 102 or 103 to be used to update fields in the target database 108, fields from each source database may need to be converted to a format suitable for comparison with data in the target database 108. It can be expected that the record layouts between various source databases 101, 102 and 103 and the target database 108 will not be identical, as discussed above. Accordingly, it is necessary to extract data from each source database so that the extracted data will be broken down into fields formatted to match the format of corresponding fields of the target database per step 301 of FIG. 3. Simultaneously with such extraction, the creation of indices on selected fields may be performed. In one embodiment, the extraction of data and creation of indices is performed through an SQL query. The specific format of such a SQL query will, of course, vary depending on the record layout of the source and target databases, and the particular fields to be indexed. SQL alone is not the subject matter of the present invention, and the technique for formulating such SQL queries is well-known in the art. A representative connect string is:

Provider=SQLOLEDB;Password=topsecret;Persist Security Info=True;User
ID=username;Initial Catalog=DatamartSRC;Data Source= Server1;Connect
Timeout=15

A representative SQL string is:
SELECT FIRST_NAME, LAST_NAME,
  NAME, TITLE,
  ADDR1, ADDR2, CITY, STATE, COUNTRY,
  PHONE, FAX_PHONE, ALT_PHONE,
  USER9, USER1, UNIQUE_ID, IDSTATUS
FROM ActDataSmall
WHERE EDIT_DATE<'MAY-20-1999'

The SQL query may be stored in the SQL string field of the data source database 104 (described above). Moreover, those of skill in the art will appreciate that there are a variety of other software based database querying and data conversion tools and utilities capable of converting a first database format to a second database format.

It will further be appreciated that because newer versions of a source database are likely to be used to update the target database on multiple occasions, it may be desirable for each source database record to have a last time updated field, which indicates the last time the record was changed. In addition, each time a version of a source database is used to update the target database 108, the time of the most recent change in the source database may be recorded. When the source database is subsequently used to again update the target database, the system can extract only those records that have been change since the last time the source database was used to update the target database. In the above example, this is done by the WHERE EDIT_DATE<'MAY-20-1999' portion of the SQL query. This may significantly reduce the size of the table extracted from the source database in step 301 and the corresponding processing time.

III. Specify Field Mapping Priorities

When the data table from the extraction process from the source database is created, it will be known how fields in the table correspond, or map, to data in the target database per step 202 of FIG. 2. Moreover, it may be desirable to use multiple source databases to update the target database. All of these mappings may be placed in the field mapping database 105 described above. In general, the field map database 105 contains a record for each field of each source database, and each such record contains a reference to the corresponding field of the target database, and, in one embodiment, a priority rank. The priority rank can be used to determine, for a particular field of a source database record, whether such field data is more likely to be more accurate than the data already stored in the corresponding field of a matching target database record. This is determined by keeping track of (via the datasource_id fields of the target database record, for example) whether the original source of the data in the field of the matching target database record came from a source likely to be more accurate than the source database being processed. This process is shown in the following example.

Partial Contents of

|  | Field Mapping Database | | | Source Database Before Updating | Target Database | |
|---|---|---|---|---|---|---|
|  |  |  |  |  | Source Database After Updating 2 | Source Database After Updating 3 |
| Data Source | Source Field Name | Target Database Field Name | Rank | | | |
| Source Database 1 | e-mail | Email | 7 | | | |
| Source Database 1 | ph | Phone | 7 | | | |
| Source Database 2 | Email_id | Email | 4 | | | |
| Source Database 2 | Phone_num | Phone | 5 | | | |
| Source Database 3 | Login | Email | 3 | | | |
| Source Database 3 | Phone_day | Phone | 3 | | | |
| Target Database | | Email | 5 | Source Database 1 | Source Database 2 | Source Database 3 |

-continued

Partial Contents of

| | Field Mapping Database | | | | Target Database | |
|---|---|---|---|---|---|---|
| | | | | | Source Database After Updating | Source Database After Updating |
| Data Source | Source Field Name | Target Database Field Name | Rank | Source Database Before Updating | Source Database 2 | Source Database 3 |
| Target Database | | Phone | 2 | Target Database | Target Database | Target Database |

In this example, the target database 108 has fields named email and phone. The corresponding fields from Source Database 2 101 are email_id and phone _num, and the corresponding fields from Source Database 3 102 are Login and Phone_day. Also, assume that a Source Database 1 101 was originally used to populate the Target Database.

Next, suppose that a specific record from each of Source Database 2 102 and Source Database 3 103 have been found to match a specific record of the Target Database 108. Further, assume that the email and phone fields of each of Source Databases 2 and 3 and the phone field of Target Database have been independently updated (with the Target Database have been manually edited). Source Databases 2 and 3 will then be sequentially processed to update the Target Database. In this scenario, when Source Database 2 is processed, the email field of the Target Database will be updated, because rank of the field email_id of Source Database 2 (4) outranks the rank of the email field of Source Database 1 (7), which is the source of the current content of the email field in the Target Database. In addition, the email source field for this record of the Target Database will change from Source Database 1 to Source Database 2. However, the phone field of the Target Database will not be updated, because its rank (2) outranks the rank of the phone_num field of Source Database 2 (5). When Source Database 3 is processed, the Login field of Source Database 3, which has a rank of 3, will overwrite the email field of Target Database, because the email field of Target Database came from Source Database 2, which has a rank of 4. In addition, the database source for the email field of the Target Database will be changed from Source Database 2 to Source Database 3. However, because the phone_day field of Source Database 3, with a rank of 3, does not outrank the phone field of the Target Database (rank 2), the phone field of the Target Database will not change.

This example shows that how the system of the present invention results in the data in the target database always being kept up to date. In addition, it shows how the data in the target database may be assigned a priority rank to prevent it from being overwritten from other data in source databases.

IV. Select Scoring Technique and Matching Threshold

It may be recalled that before the fields of the Target Database 108 may be updated as described above, it is first necessary to determine whether a particular source record from a source database matches a target record in the Target Database 108. If a particular source database record has been previously matched with a target database record, this will be readily known because the primary keys of each record will appear in a record of the Source Record to Target Record Map Database 106 described above. Otherwise, it will be necessary to examine the data of the source database record and determine whether there is record in the target database 108 with data sufficiently similar to data of the source database record to conclude that the two records identify the same audience member. Representative criteria for determining whether such a match exists are as follows.

Certain fields appearing in both the source and target databases may have weights assigned to them, such as:

FNAME_WEIGHT=7 first name
LNAME_WEIGHT=8 last name
PHONE_WEIGHT=5 main phone line
PHFAX_WEIGHT=3 fax phone
PHALT_WEIGHT=3 alternate phone
PHFLT_WEIGHT=3 used when a phone number matches one in another field, e.g. fax=alt
EMAIL_WEIGHT=5 email
ADDRS_WEIGHT=1 address street
ADDRR_WEIGHT=1 address room number
ADDRC_WEIGHT=1 address city
ADDRT_WEIGHT=1 address state
ADDRZ_WEIGHT=1 address zip
CMPNY_WEIGHT=3 company
EXATR_WEIGHT=1 other attributes provided by the user Each of these is a multiplier of the match score of −100 to 100. A negative number is a miss, 0 is used when no data for a field is source, and a 100 represents a perfect match. Partial matches (misspellings, nicknames, etc.) are source partial scores less than 100.

For partial matches, the system may assign percentages to a score as follows if the candidate field:

Has an extra character, 70%
Is missing a character, 80%
Has 2 characters transposed, 80%
Has an incorrect character. 60%

If any of these are found to be true, the score is the source percentage portion of 100 points.

A representative "loose matching" algorithm for finding extra, missing, incorrect or transposed characters in a field is described in *An Assessment of Name Matching Algorithms,* A. J. Lait and B. Randell, Department of Computing Science, University of Newcastle upon Tyne (http://www.cs.ncl.ac.uk/~brian.randell/home.informal/Genealogy/NameMatching.txt). This, and other, loose matching algorithms compare text fields (which may include numerals or punctuation, as opposed to graphics or floating point numerical fields) using two sliding windows that move along each word trying to mate up characters and patterns. In this embodiment, scoring of compares is done by starting with a score equal to the sum of the lengths of the two words and subtracting points for each character that is not the same. The final score is the remaining points divided by the initial sum. There are also cases when no match is declared and the score is 0.

Thus, each mapped field is assigned a match score value based on the comparison to the source record, and all the match scores for a target record are aggregated to produce a record score.

In one embodiment, the minimum score for a target record necessary to conclude that a match candidate exists is a score of 1100. Of course, this can be changed according to the users preferences for duplicates versus incorrect matches. The target database record having the highest aggregated score can be selected and processed/updated as described herein.

Of course, the particular matching criteria for a particular audience member database will depend on the fields available for matching the perceived accuracy of the respective databases, and the number of records in the databases.

V. Process Source Databases

Source database may be processed sequentially. For each source database 101, 102 or 103 used to update the target database 108, the following steps may be performed.

A. The SQL query, as discussed above, is applied to extract data from the source database into the staging area.

B. Each record in the extracted table is processed as follows.

1. The primary key of the source database is used to see if a corresponding record for the same audience member exists in the target database per step 303. In one embodiment, the query is performed on the Source Record to Target Record Map Database 106 described above. If such a record exists, skip to step (c) below. If no record exists, then it means that there is no pre-defined relationship between the source audience member record and any record of the target audience member database. Accordingly, it is necessary to then check to see if the same audience member is represented in the target database by determining whether matching data exists, as follows:

(a) Query the target database to generate a set of references to possible matching, or "candidate," records. For example, assume a source database record contains the following information: John Smith, 123 Main Street, Anytown, N.Y. 12345, Phone (123) 456-7890, email johns@foo.com. First, the last name is encoded. Assume the encoded value is s530. The target database is then queried for records with this same encoding for last name,.with a command such as SELECT * FROM target_db WHERE last_name_code='s530.' Next the process is repeated with the email field: SELECT * FROM target_db WHERE email_id_code='j520.'All the references to candidate records from both queries are combined into a single set. If a larger candidate is desired, similar queries on other fields may be performed, for example, SELECT * FROM target_db WHERE zip_code LIKE '123%' (Zip codes staring with 123); or SELECT * FROM target_db WHERE phone LIKE '%7890'(Phone numbers ending with 7890); or SELECT * FROM target_db WHERE last_name_code LIKE 's5' (Names that start like Smith). The references to candidate target database records may comprise a list of primary keys of such records.

If desired, this process may continue for other fields common to the source and target databases so that the candidate set will be even larger.

(b) After a candidate set of references to target database records has been created, the next step is to score the candidate records from the target database to determine whether any meets the previously determined minimum threshold for a match, and if so, to determine which record has the highest ranking for a match. This process is done according to the scoring criteria, a representative embodiment of which is described above. In that embodiment, at least one candidate record must achieve a score of 1100 to be declared a match. If no match is created, then a new target database record is created by copying all corresponding fields from the source record to a new target database record. In addition, for each field group in the new target database record, the source database is specified for the fields name_datasource_id, address_datasource_id, phone_datasource_id, and email_datasource_id, to indicate that the new target record information came from the particular source database. Of course, the Source Record to Target Record Mapping Database 106 is also updated to specify the primary key of the source and target databases. Processing may then continue with the next source database record.

(c) If a match is found between the source database record and a target database record, then the next step is to determine whether any information should be copied from the source database to the target database. This is done by examining the priority ranks for each type of information for the target database record, which, in one embodiment, are stored in the field mapping database 105. For each rank, the target record rank is compared to the rank for the source database. If the source database rank is higher, then the corresponding data from the source record is copied to the target record. In addition, the name_datasource_id, address_datasource_id, phone_datasource_id, and email_datasource_id fields in the Target Database are updated if the data copied includes data falling into these field groups.

It should be noted that in examining the field mapping database 105, one of the source databases may be the target database 108 itself. The target database 108 may be assigned a higher priority than a source database if, for example, the user of the system manually updates the source database with new information, and it is believed that such information is likely to be more accurate than at least one source database. Such updating of the target database 108 may be done via a graphical user interface of the type well known to those of skill in the art.

(d) In some instances, if the target database 108 contains information believed to be more current than the source database, and if the source database is of a type that may be re-used, it will be desirable to copy information from the target database 108 back to the corresponding matching record of the source database. Whether this is desirable may be determined by relative rankings of the source and target databases for the particular fields or field groups.

Processing may then continue with the next source database record.

C. After all records in the source database have been processed, the procedure may be repeated with other source databases, or with a later version of the same source database.

Fine Tuning

In one embodiment, the matching criteria, as described above, may be selectively changed by the user of the system, for example, by specifying a match-closeness parameter 109. This may be desirable, because, the more closely a match must be, the more processing time may be required to determine whether a match exists. Some businesses may find it acceptable to minimize processing time in exchange for less accurate information in the target database 108. This accuracy decrease results from the reduced likelihood that the best target audience member record is in the candidate set. If it is not in the set, then either the record will be incorrectly matched, or a new (duplicate) record will be added. Conversely, a process oriented toward speed would not only restrict the size of the candidate set, but also loosen the requirements for a candidate being declared a match, as discussed below.

For example, in one embodiment, the "speed vs. data accuracy" configuration can be set by the end user by specifying a high speed/low matching accuracy or low speed/high matching accuracy by a user interface display, such as a radio button.

| Field | High Speed - Low Matching Accuracy | Low Speed - High Matching Accuracy |
| --- | --- | --- |
| Zip Code | nn* | nnn* |
| Last Name | One spelling deviation | Two spelling deviations |
| City Name | One spelling deviation | Two spelling deviations |

In one embodiment, the change in specified accuracy would be manifested by an alteration to the SQL query used to extract data from a source database to a staging area, as described above.

Alternatively, a slider control could be utilized, or the user could be presented with multiple fields and allowed to specify the desired matching criteria, such as a zip code matching the first two, three or four numerals, thus allowing the close-matchness parameter to have more than two values.

Those of skill in the art will appreciate that in the flowchart shown in FIG. 3, all source database records are first extracted, then, on a record by record basis, a matching record in the target database is identified and the data for the matched record in the target database is updated, if appropriate. It is also within the scope of the invention to find all matching target database records for all source records before updating any of the data in the target database. This approach can improve processing speed.

What is claimed is:

1. A software system comprising:
   a. a plurality of source databases, each source database comprising:
      1. a plurality of source audience member records, and
      2. a plurality of source fields for each source audience member record;
   b. a target database comprising:
      1. a plurality of target audience member records, at least some of which identify the same audience member identified by at least one source database audience member record, and
      2. a plurality of target fields for each target audience member record;
   c. means for mapping the plurality of target database fields to corresponding source fields of the plurality of source databases, and, for each such mapping, means for ranking a relative priority of the mapping;
   d. means for specifying a ranking for each of the plurality of target fields relative to the rankings of the field's mappings to the plurality of source databases;
   e. means for selecting from at least one of the plurality of source databases, a source audience member record that matches a target audience member record;
   f. means for updating the fields in the target matching record of the target database from multiple mapped fields in the plurality of source databases, including selecting, from among the source database fields to which the target database fields are mapped and the target database field itself, the highest ranked priority fields.

2. The system of claim 1, further comprising means for manually editing fields of target audience member records.

3. The system of claim 1, wherein the means for updating the fields in the target database, updates the corresponding field in the target database for only the highest ranked priority non-blank field.

4. The system of claim 1 wherein,
   each source audience member record and each target audience member record includes a primary key.

5. The system of claim 4, wherein,
   each source audience member record includes a last updated time/date field.

6. A method for generating, for a source audience member record having at least first and second fields, a set of matching candidate audience member records having multiple fields from a target audience member database, wherein there is no pre-defined relationship between the source audience member record and any record of the target audience member database records, comprising the steps of:
   a. providing first and second indices to the target audience member database based on at least first and second fields of the target database;
   b. specifying a match-closeness parameter;
   c. generating multiple references to records of the target audience member database by querying the first index for similarities based on the first field of the source audience member record, the quantity of multiple references being responsive to the match-closeness parameter; and
   d. generating additional multiple references to records of the target audience member database by querying the second index for similarities based on the second field of the source audience member record, the quantity of additional multiple references being responsive to the match-closeness parameter.

7. The method of claim 6, wherein the close-matchness parameter may have more than two values.

8. The method of claim 6, further comprising the steps of:
   e. selecting one of the references to records of the target audience member database; and
   f. updating at least one field from the selected target audience member database record by replacing its data with data from the source audience member record.

9. A method for updating a target record having at least two fields of an audience member database that identifies the same audience member of a source audience member record having at least two fields, wherein there is no pre-defined relationship between the source audience member record and any record of the target audience member database, comprising the steps of:

a. providing at least one non-encoded field index to the target audience member database based on at least a first field of the database;
b. providing at least one encoded field index to the target audience member database based on a second field of the database;
c. querying each of the at least one non-encoded indices for matches to a field of the source audience member record, and storing references to target audience member database records having matching value fields in the set of matching candidate audience member records;
d. encoding a value of a field of the source audience member record that corresponds to an encoded index of the target audience member database;
e. querying the at least one encoded field index for matches to the encoded field value of the source audience member record, and storing references to target audience member database records having matching encoded value fields in the set of matching candidate audience member records;
f. selecting a single references to a target audience member database records; and
g. replacing at least one field in the record of the target audience member database that matches the selected reference, with the at least one corresponding field of the selected source audience member record.

10. The method of claim 9 further comprising the step of: specifying a match-closeness parameter; and
wherein the number of references to records of the target audience member database generated in by the querying steps is responsive to the match-closeness parameter.

11. The method of claim 9 further comprising the step of: scoring each of the target audience member database records referred to by the stored references.

12. A method for selecting one of a subset of target audience member records and updating at least one field of the selected record with information from at least one field of a source audience member record, comprising the steps of:
a. mapping a plurality of fields from the source audience member record to corresponding fields in the subset of target audience member records, each of the corresponding fields having textual content;
b. for each record of the subset of target audience member records:
  1. and for each mapped field of each target audience member records:
     A. comparing the field to the corresponding field of the source audience member record by a loose matching algorithm;
     B. assigning a match score value to the mapped field of the target audience member record based on the comparison;
  2. aggregating the plurality of match scores for the mapped fields for the target audience member record;
d. selecting the target audience member record having the highest aggregated match score value; and
e. updating a plurality of fields in the selected target audience member record with information from corresponding fields from the source audience member record.

13. The method of claim 12 wherein the encoding of fields includes phonetic encoding.

* * * * *